United States Patent [19]
Fudemoto et al.
[11] 3,796,956
[45] Mar. 12, 1974

[54] BLOCK SYNCHRONIZATION SYSTEM OF MULTINARY CODES

[75] Inventors: Isao Fudemoto; Masakatsu Sakai; Yozo Fujisaki, all of Tokyo, Japan

[73] Assignee: Fujitsu Limited, Kawasaki, Japan

[22] Filed: Dec. 20, 1971

[21] Appl. No.: 210,085

[30] Foreign Application Priority Data

Dec. 23, 1970 Japan .............................. 45/117122
Dec. 26, 1970 Japan .............................. 45/125253

[52] U.S. Cl. ..... 325/38 A, 178/69.5 R, 340/347 DD
[51] Int. Cl. ............................................... H04b 1/00
[58] Field of Search ............ 178/68, 69.5 R, DIG. 3; 340/146.1 AB, 146.1 D, 347 DD; 325/38 A, 58; 179/15 BS

[56] References Cited

UNITED STATES PATENTS

| | | | |
|---|---|---|---|
| 3,439,330 | 4/1969 | Sipress et al. | 325/38 A UX |
| 3,587,088 | 6/1971 | Franaszek | 340/347 DD |
| 3,621,140 | 11/1971 | Griffiths | 178/69.5 R |
| 3,509,278 | 4/1970 | Bergholm | 178/69.5 R |
| 3,418,579 | 12/1968 | Hultberg | 325/58 X |

*Primary Examiner*—Charles D. Miller
*Attorney, Agent, or Firm*—Herbert L. Lerner

[57] ABSTRACT

A multinary transmission system transmits multinary code blocks converted in block unit from binary codes. When two identical code blocks are to be transmitted continuously, the succeeding code block is converted into a code block having special patterns so that the same pattern as the patterns of the preceding code block may not appear in the succeeding code block. Thus, the multinary code block is so constituted that no specific two codes may be generated continuously and transmission is such that the specific two codes may be continuous only at the break point of the block. Block synchronization is provided at the receiver by detecting the special patterns or by detecting two specific continuous codes.

2 Claims, 24 Drawing Figures

SERIES TO PARALLEL CONVERTING CIRCUIT

REGULAR CONVERTING CIRCUIT

PATTERN DISCRIMINATING CIRCUIT FIG.5

IRREGULAR CONVERTING CIRCUIT FIG.6

SYNCHRONIZED PATTERN GENERATING CIRCUIT

TIMING CIRCUIT

| TERMINAL | SIGNAL |
|---|---|
| 200 | M21 |
| 201 | M21' |
| 202 | |
| 203 | M22 |
| 204 | M22' |
| 205 | M23 |
| 206 | M23' |
| 207 | M24 |
| 208 | M24' |
| 209 | M25' |
| 210 | M25'' |
| 300 | M31 |
| 301 | M31' |
| 302 | M31'' |
| 303 | M32 |
| 304 | M32' |
| 305 | M33 |
| 306 | M33' |
| 307 | M34 |
| 308 | M34' |
| 309 | M35 |
| 310 | |
| 400 | M41 |
| 401 | M41' |
| 402 | |
| 403 | M42 |
| 404 | M42' |
| 405 | M43 |
| 406 | M43' |
| 407 | M44 |
| 408 | M44' |
| 409 | M45' |
| 410 | M45'' |

PARALLEL TO SERIES CONVERTING CIRCUIT

MULTIVALUE PULSE GENERATING CIRCUIT

RECEIVED SIGNAL REGENERATING CIRCUIT

TIMING CIRCUIT

SERIES TO PARALLEL CONVERTING CIRCUIT

MODE IDENTIFICATION CIRCUIT

PARALLEL TO SERIES CONVERTING CIRCUIT

IRREGULAR REVERSE CONVERTING CIRCUIT

BLOCK SYNCHRONIZATION SYSTEM OF MULTINARY CODES

The present invention relates to a PCM transmission system for mulinary codes. More particularly, the invention relates to a block synchronization system of multinary codes.

In the efficient transmission of digital signals by the use of a transmission line of comparatively good quality, a multinary transmission system is frequently used, so that the bandwidth required may be reduced. In such case, transmission pulses are permitted to have one of *m* amplitude values predetermined, and accordingly informations of $\log_2 m$ bits may be transmitted by one pulse. In a multinary transmission, however, the direct current component may be generated due to the patterns of codes to be transmitted. On the other hand, an ordinary relay transmission system does not pass the component of the direct current through. Thus, in order to provide transmission, the direct current component must be removed by some method. One known method is a transmission system wherein multinary codes are divided into blocks and the pattern of the signal is properly converted for every block so that as a whole the direct current component may not be generated. Accordingly, at the receiver of such a transmission system, it becomes necessary to detect the break point of the block accurately and to return the pattern of the code to the initial condition.

This invention relates to a method of detecting the break point of the block. In other words, the invention relates to a method of achieving a block synchronization.

The block synchronization may be achieved by the insertion of synchronizing pulses or by the utilization of redundancy in the code conversion. The insertion of synchronizing pulses varies the frequency of the output and therefore complicates the device. For this reason, the redundancy method is presently adopted. Besides, "1 block 3 digits" and "1 block 5 digits" have been published as the redundancy method, which utilizes redundancy in the code conversion. In the case of "1 block 3 digits," more than two patterns out of 16 patterns not used must be detected in parallel, but the probability of generation of the patterns not used is not greatly different from the probability of generation of the signal patterns and a long time is required for the synchronized reset.

In the case of "1 block 5 digits," 0 is not allowed to the first digit of a block and continuous 5 digits are supervised to detect the position where 0 is not generated. The synchronization may thus be achieved. "1 block 5 digits" is superior to "1 block 3 digits " in synchronization characteristic, but inferior in code conversion efficiency because in "1 block 3 digits" the low frequency component of the output signal increases.

From this point of view, the object of the invention is to provide a block synchronization system of "1 block 4 digits" having an excellent synchronized reset characteristic and also having a higher conversion efficiency than "1 block 5 digits."

More particularly, the principal object of the invention is to provide a block synchronization system in a multinary transmission system which transmits multinary code blocks converted to block units from binary codes, in which block synchronization is achieved by converting, when two identical code blocks are to be transmitted continuously, the succeeding code block into a code block havng special patterns so that the same pattern as the patterns of the preceding code block may not appear in the succeeding code block, and by detecting the special patterns at the receiver.

Another object of the invention is to provide a block synchronization system in a multinary transmission system which transmits multinary codes converted to block units from binary codes, in which block synchronization is achieved by constituting the multinary code block, so that no two specific codes may beegenerated continuously, and then by detecting the two specific continuous codes at the receiver.

Another object of the invention is to provide a block synchronization system in a multinary code transmission system which transmits multinary code blocks converted to block units from binary codes, in which when the identical code blocks are to be transmitted continuously, the succeeding code block is converted into a code block having special patterns so that the same pattern as the patterns of the preceding code block may not appear in the succeeding code block and the multinary code block is so constituted that two specific codes may not be generated continuously. Thus, the bock synchronization is achieved by detecting the special patterns and also detecting the two specific continuous codes.

In order that the invention may be readily carried into effect, it will now be described with reference to the accompanying drawings, wherein.

Figure 2:
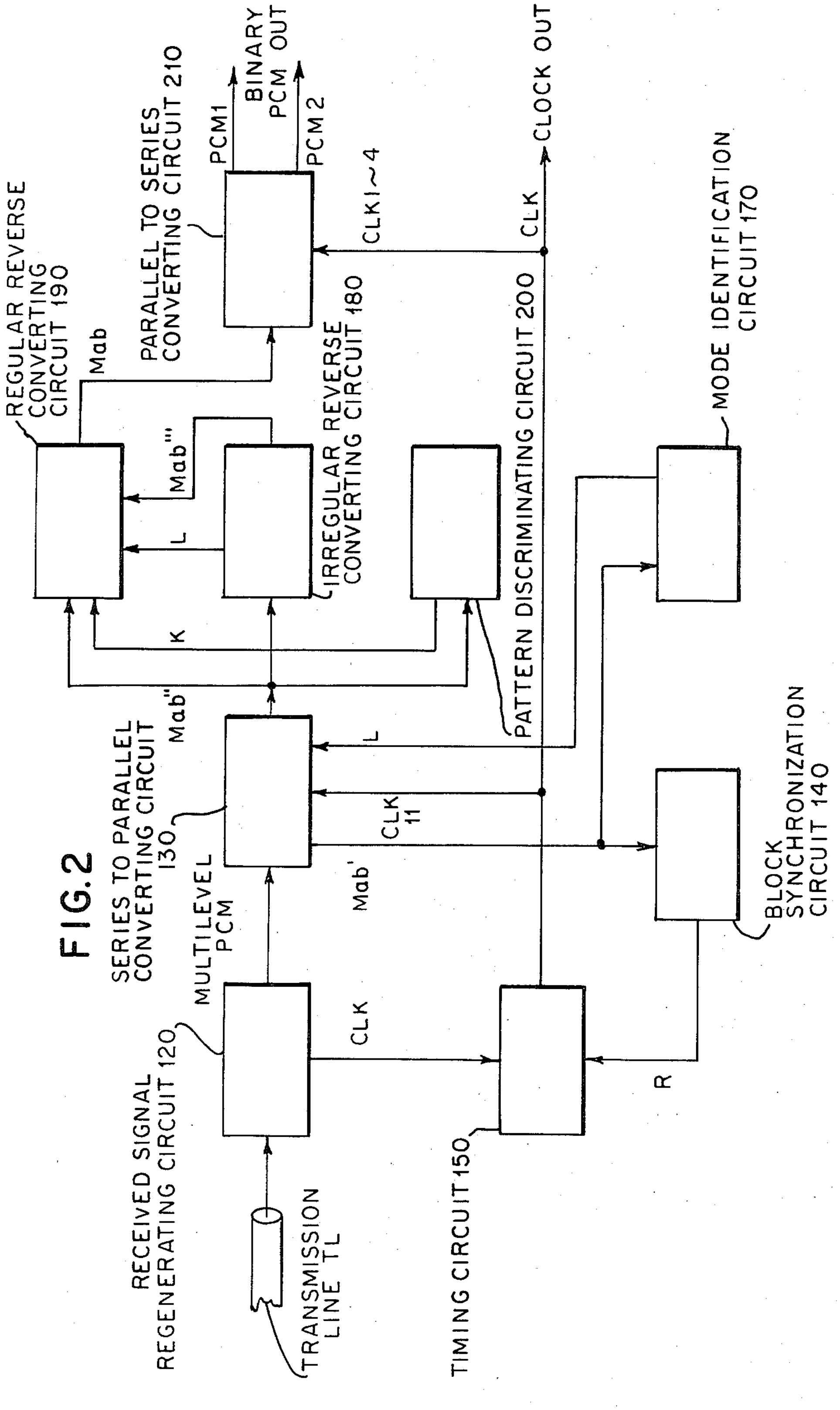
FIG. 2 is a block diagram of an embodiment of a receiver to which the block synchronization system of the invention is applied.
Figure 15:
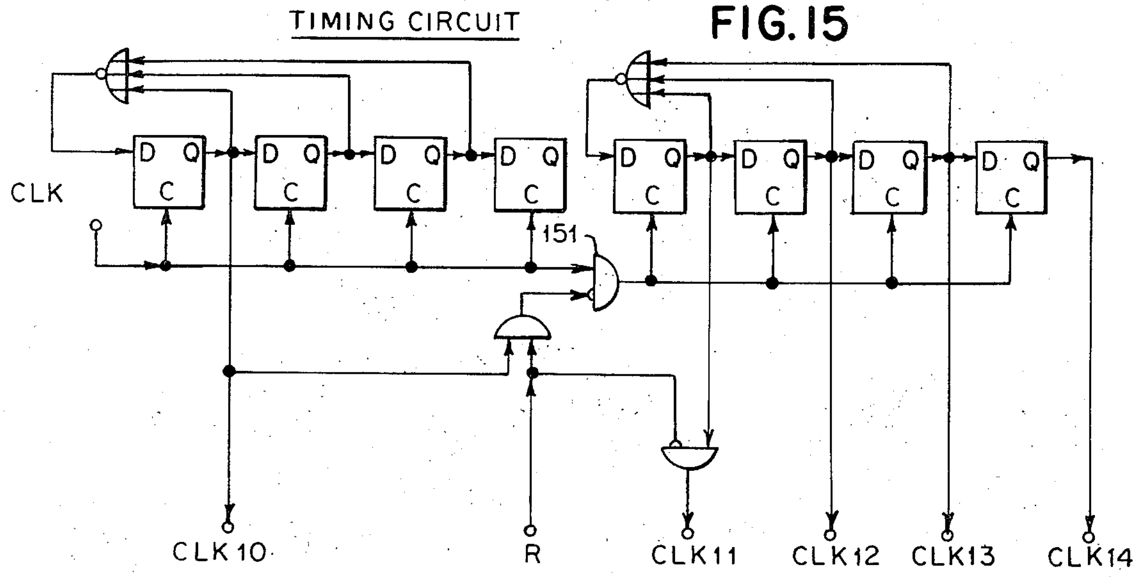
FIG. 15 is a block diagram of the timing circuit of FIG. 2.
Figure 16A:
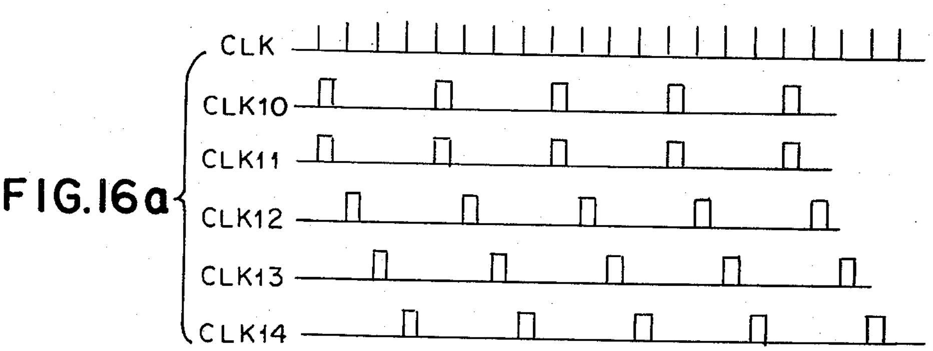
Figure 16B:
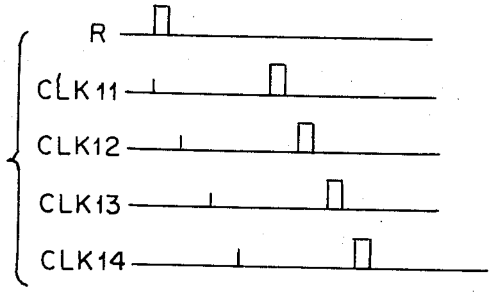
Figure 17:
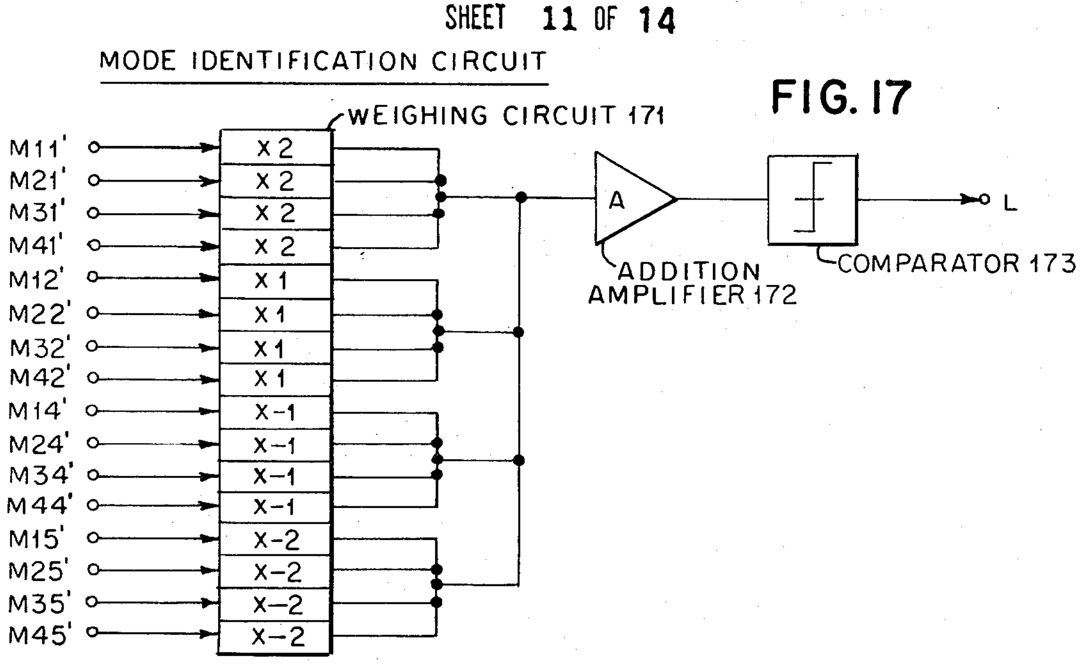
Figure 21:
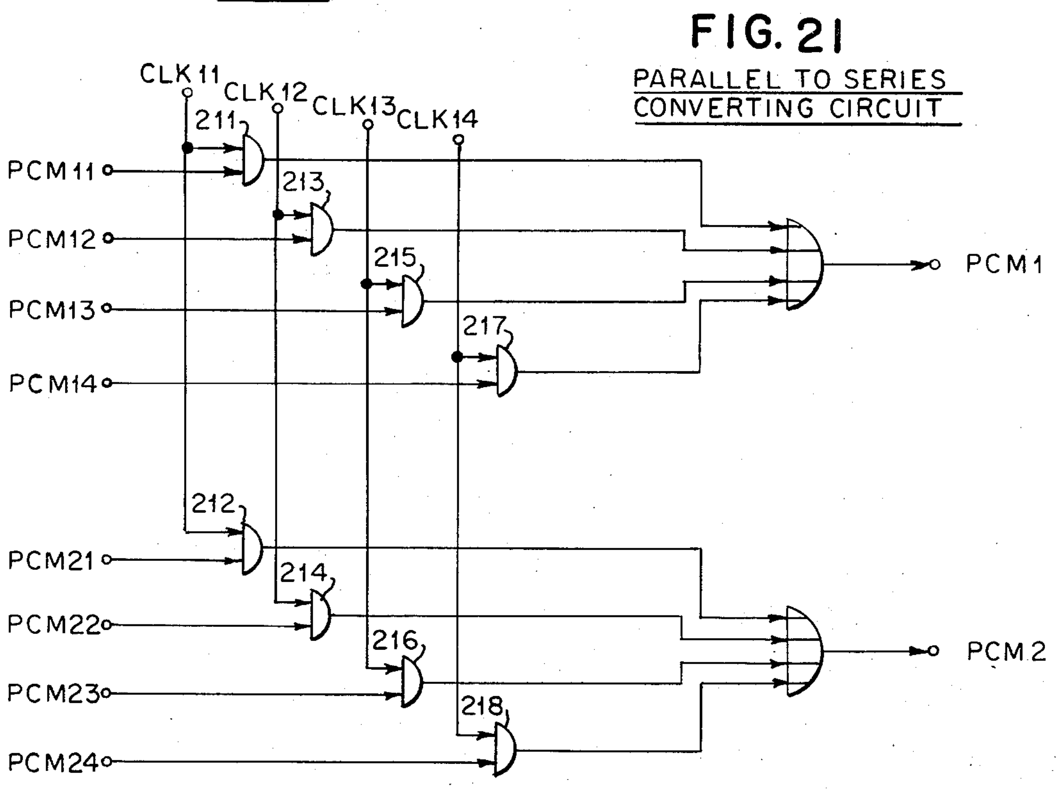
Figure 18:
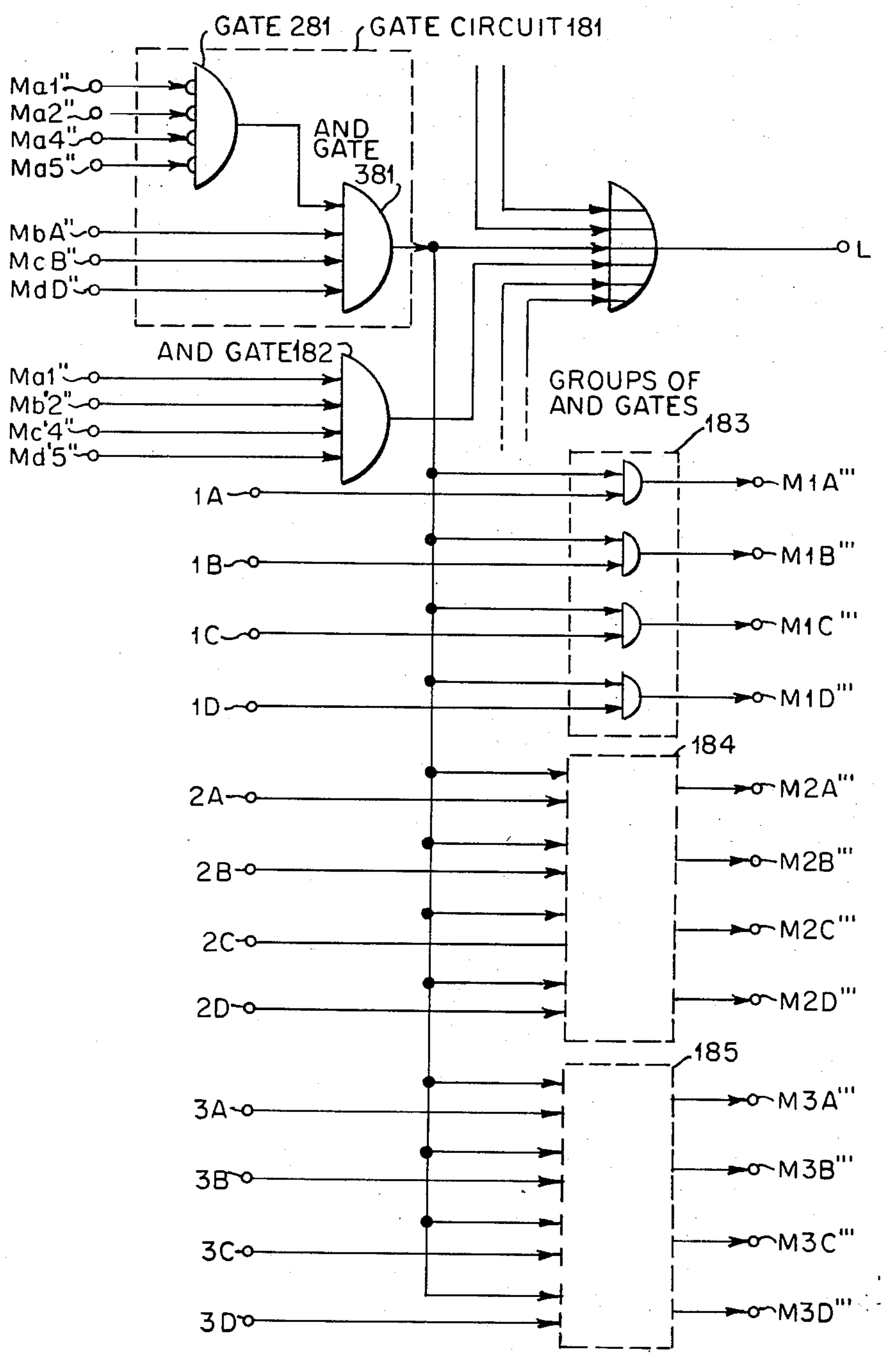
Figure 19:
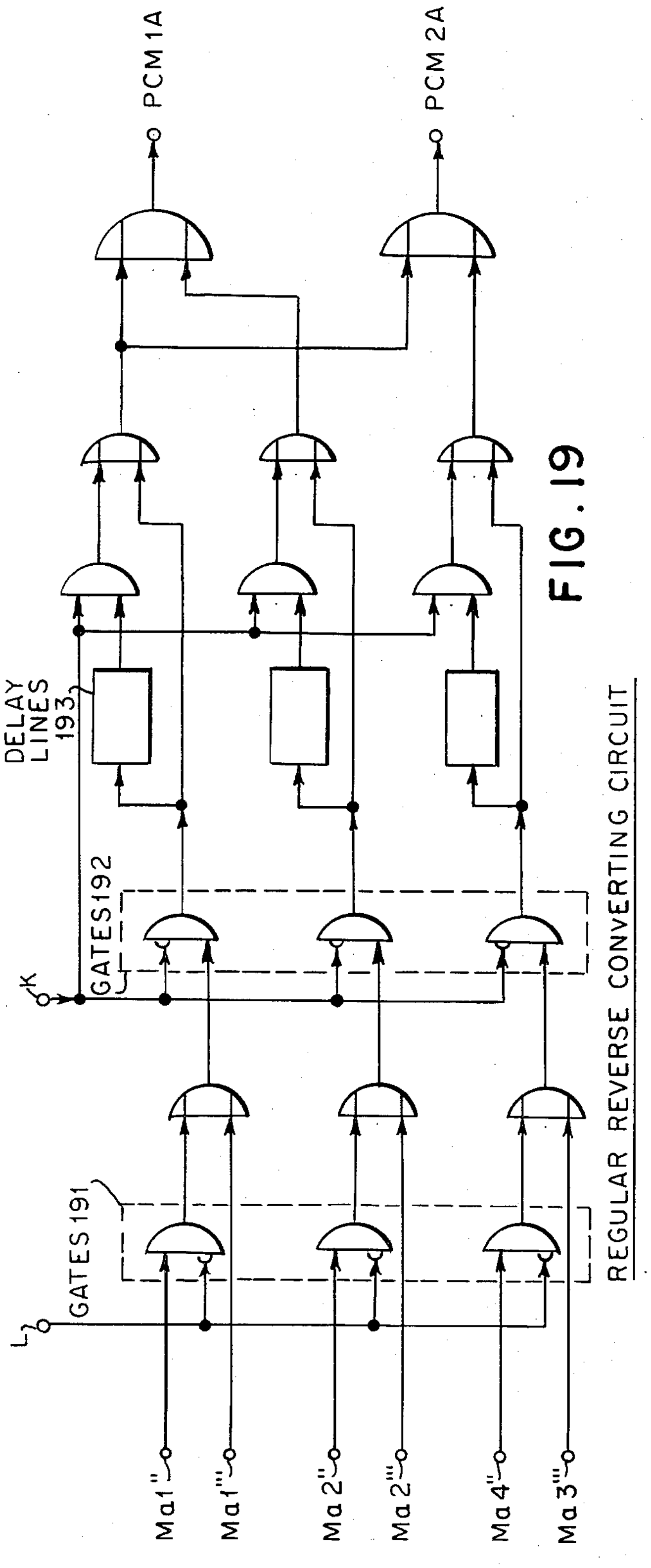
Figure 20:
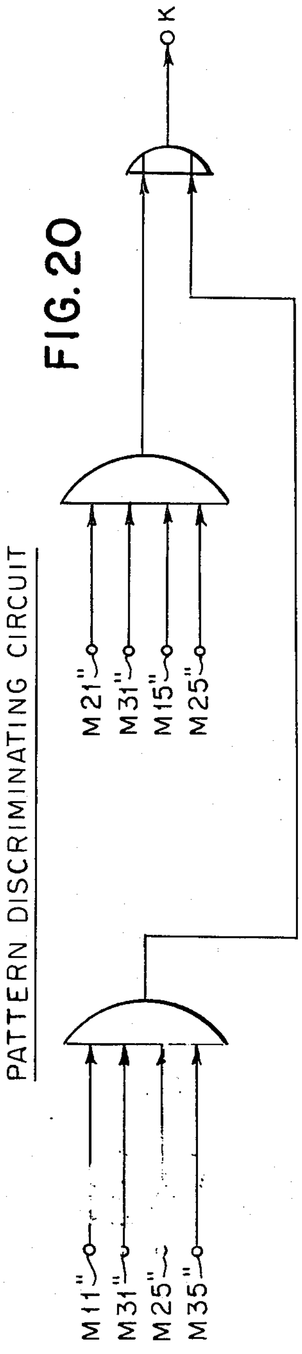
Figure 22:
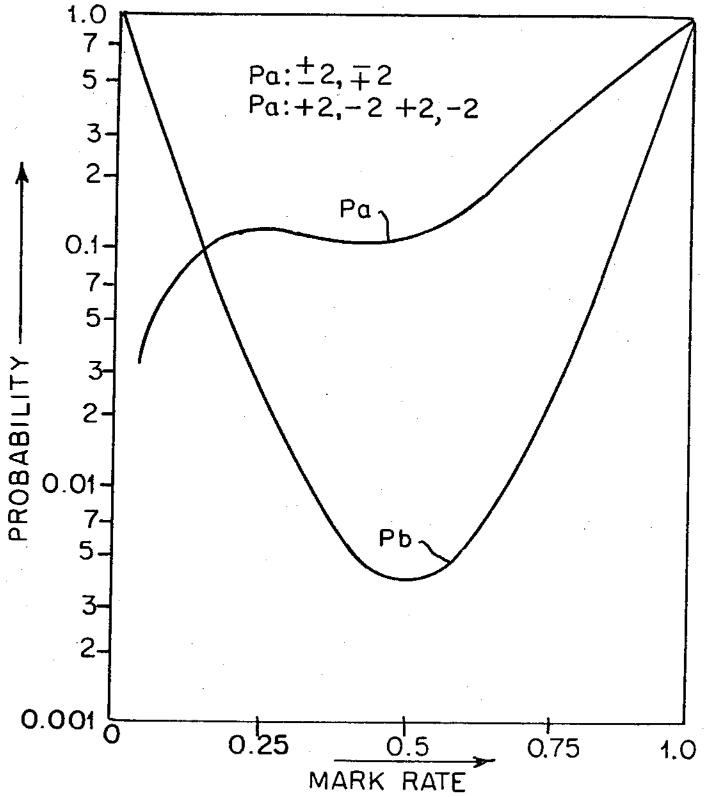
Figure 23:
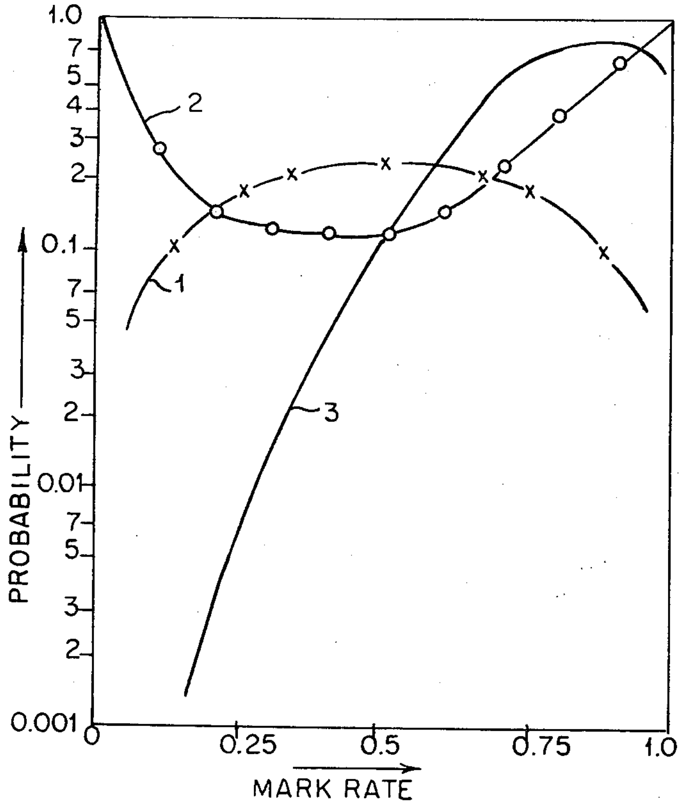

FIGS. 16*a* and 16*b* are time charts of each clock signal of FIG. 15;

FIG. 17 is a block diagram of the mode discriminating circuit of FIG. 2;

FIG. 18 is a block diagram of the irregular reverse conversion circuit of FIG. 2;

FIG. 19 is a block diagram of the regular reverse conversion circuit of FIG. 2;

FIG. 20 is a block diagram of the synchronized pattern discriminating circuit of FIG. 2;

FIG. 21 is a block diagram of the parallel to series converting circuit of FIG. 2;

FIG. 22 is a graphical representation for explaining the effect of the system of the invention; and FIG. 23 is a graphical presentation for illustrating the comparison between the system of the invention and the conventional system.

The following Table 1 shows a conversion system of converting codes of two binary systems to codes of one quaternary system.

TABLE 1

| [Regular Conversion] | [Irregular Conversion] | |
|---|---|---|
| Conversion from binary to quaternary | The algebraic sum | (2,1,1,−2) |
| | of quaternary | (2,1,0,−2) |
| 11 → +2 | 4 bits codes is | (2,1,−1,−2) |
| 10 → +1 | negative. | (2,0,0,−2) |
| 01 → 0 | (35 blocks) | etc. |
| 00 → −1 | | |

The regular conversion converts codes bit by bit into quaternary codes. Then, the block codes of quaternary continuous 4 bits by regular conversion, the algebraic sum of which codes is negative such as, for example, (2 −1 −1 −1), (0 −1 0 −1), (1 0 −1 −1), etc., are converted by irregular conversion into block codes each of which includes 2 and −2, in which 2 and −2 are not continued one after the other.

Figure 1:
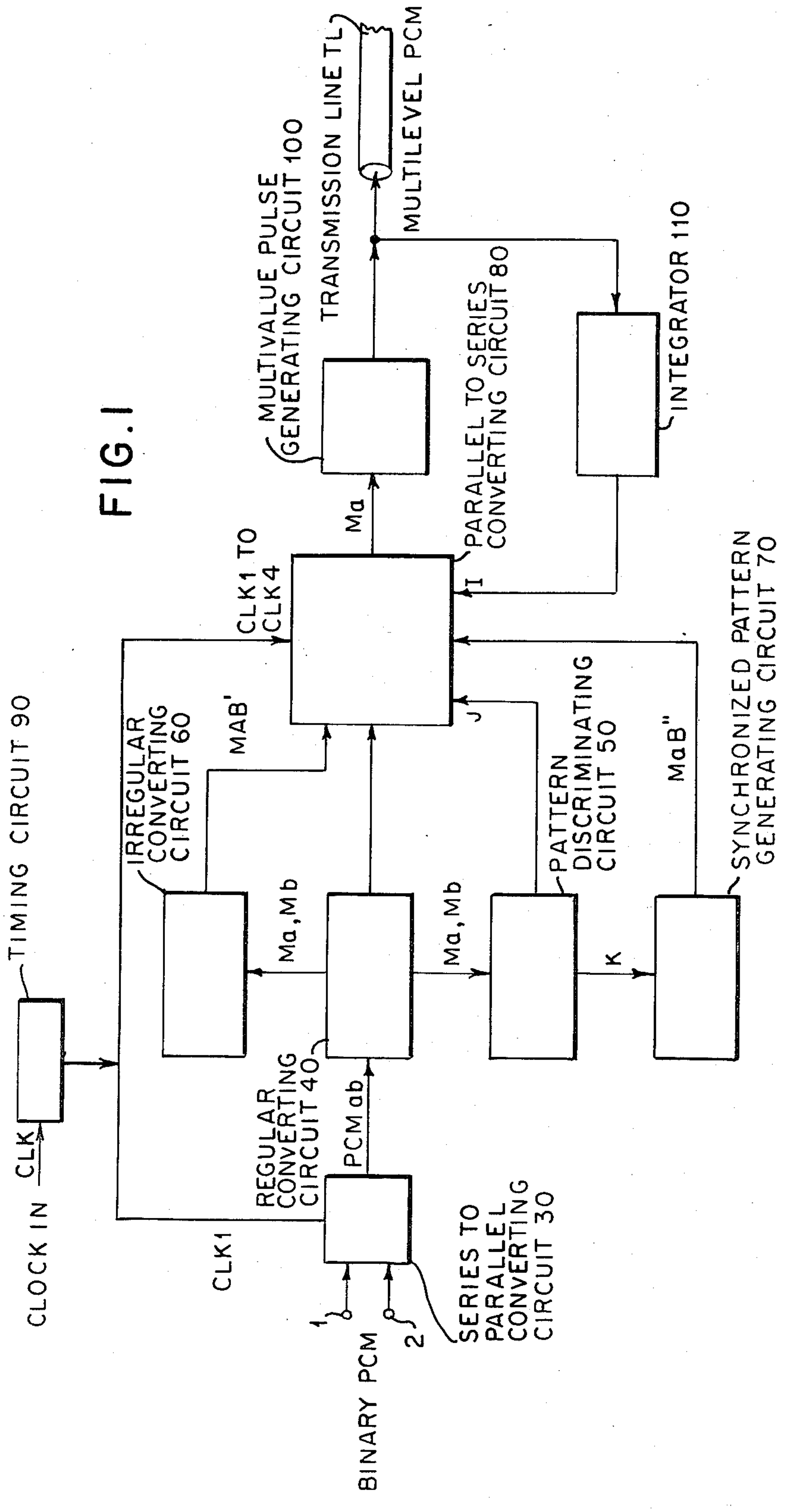
FIG. 1 is a block diagram of an embodiment of a transmitter to which the block synchronization system of the invention is applied.

FIGS. 1 and 2 illustrate an embodiment of the block synchronization system of the invention. FIG. 1 illustrates the transmitter and FIG. 2 illustrates the receiver. Two binary systems of PCM signals are supplied as inputs to input terminals 1 and 2 of FIG. 1. The binary signals of two systems are supplied to a series to parallel converting circuit 30 shown in FIG. 3

Figure 3:
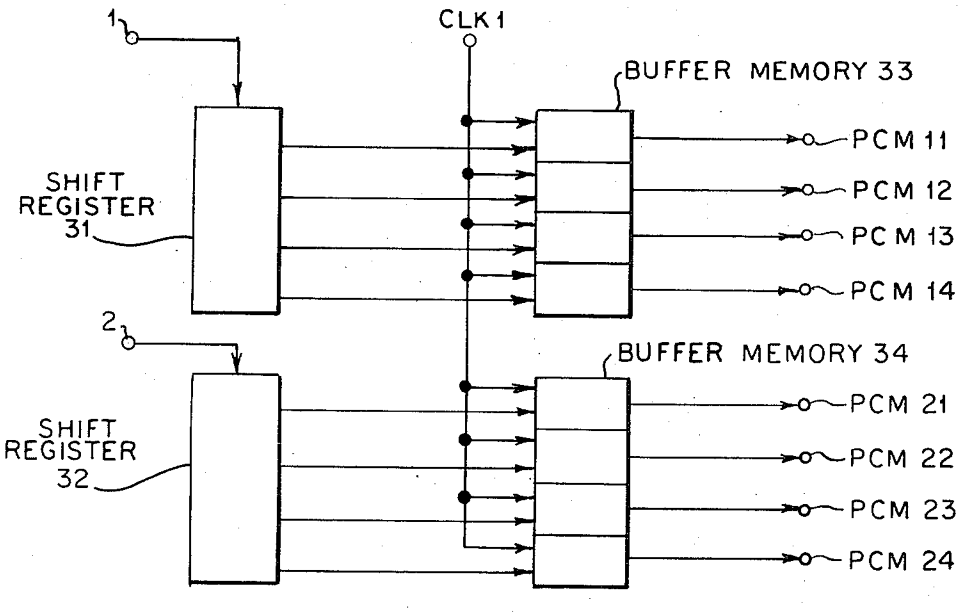
FIG. 3 is a block diagram of the series to parallel converting circuit of FIG. 1.

The series to parallel converting circuit 30, as shown in FIG. 3, comprises shift registers 31 and 32 in common to each system and buffer memories 33 and 34. The shift registers 31 and 32 are shifted by PCM signals and stored in the buffer memories 33 and 34. A clock CLK1 is supplied to the fourth bit of the PCM signal. The parallel outputs of the buffer memories 33 and 34 are PCM11 to PCM14 and PCM21 to PCM24.

Figure 4:
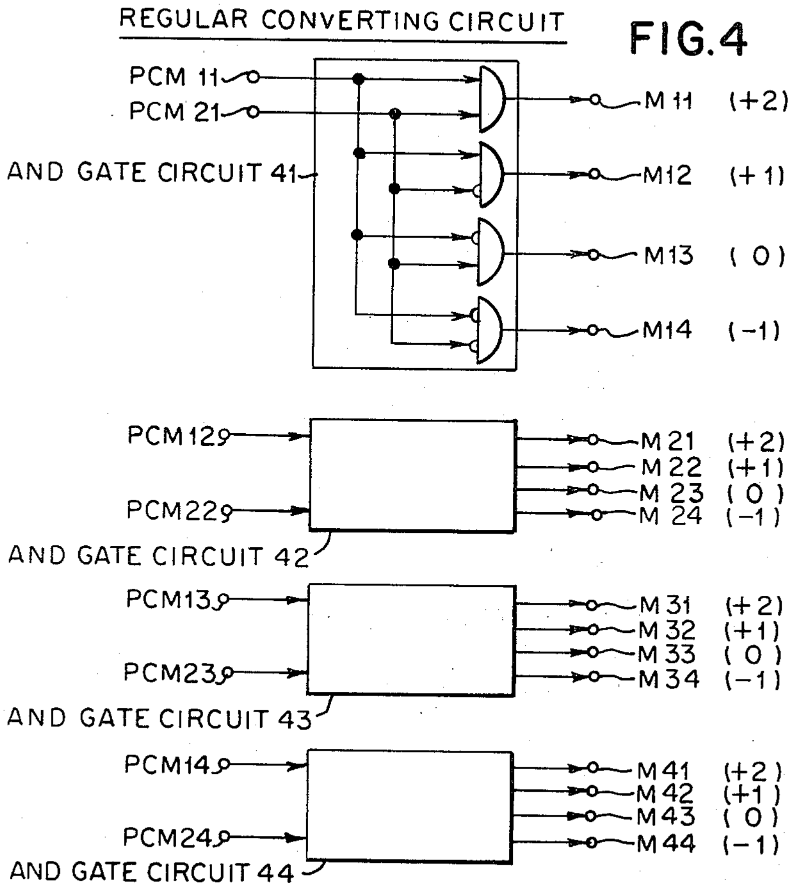
FIG. 4 is a block diagram of the regular converting circuit of FIG. 1.

The parallel signal outputs PCM11 to PCM14 and PCM21 to PCM24 are then fed to a regular converting circuit 40 shown in FIGS. 1 and 4, and converted bit by bit into quaternary codes in accordance with the regular conversion of the present invention. In FIG. 4, circuits 41 to 44 are all the same. Each of the circuits 41 to 44 comprises an AND gate circuit. Each of the AND gate circuits 41 to 44 provides outputs M11, M12, M13, M14, . . . M41, M42, M43, M44.

It is assumed that the parallel outputs PCM11 to PCM14 are (1100) and the parallel outputs PCM21 to PCM24 are (1001). The output of the AND gate circuit 41 is (1000) = (M11, M12, M13, M14), the output of the AND gate circuit 42 is (0100) = (M21, M22, M23, M24), the output of the AND gate circuit 43 is (0001) = (M31, M32, M33, M34), and the output of the AND gate circuit 44 is (0010) = (M41, M42, M43, M44). Accordingly, the two binary systems PCM11 and PCM21 are converted to +2, PCM12 and PCM22 to +1, PCM13 and PCM23 to −1, and PCM14 and PCM24 to 0 in accordance with the regular conversion.

Figure 5:
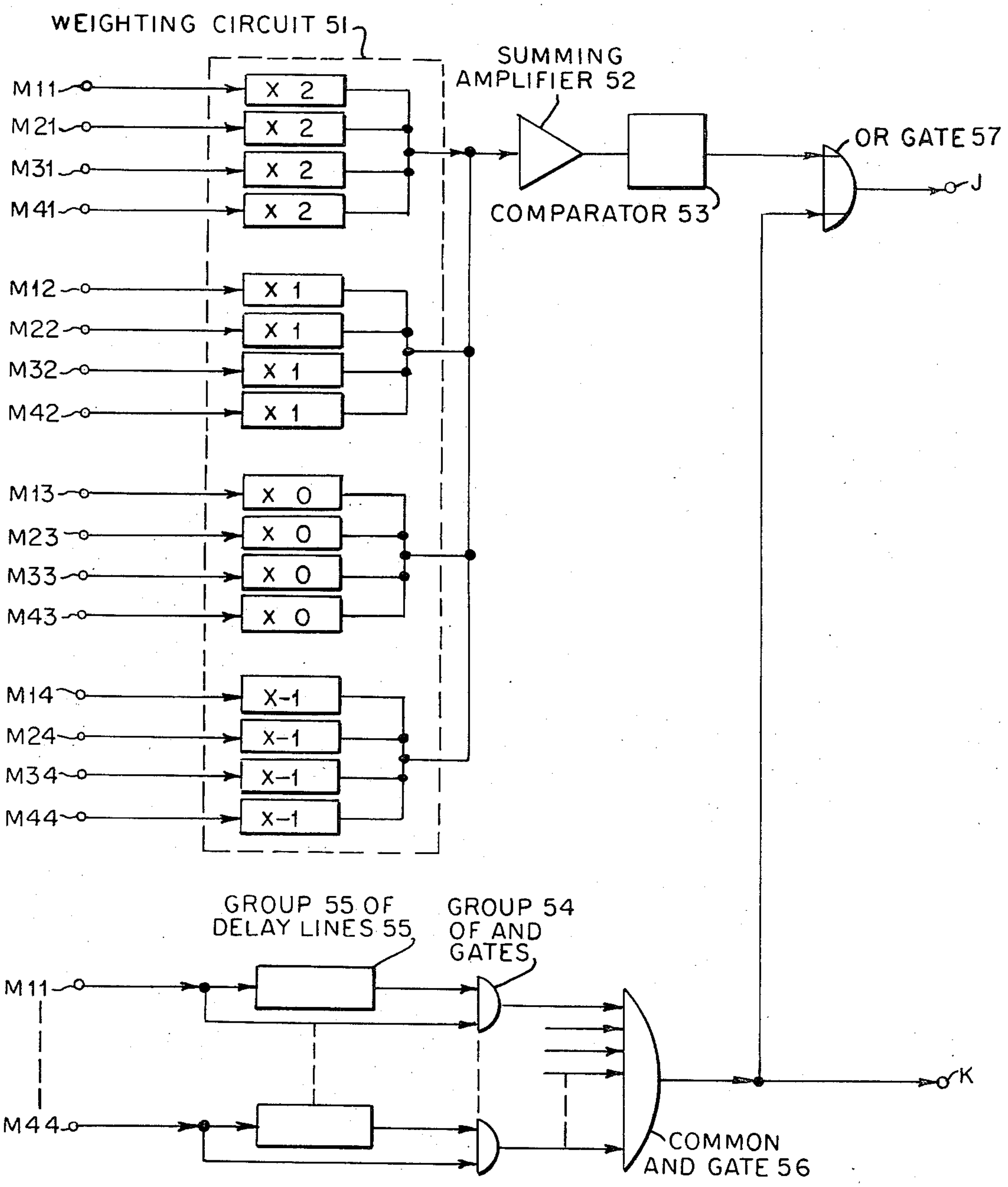
FIG. 5 is a block diagram of the pattern discriminating circuit of FIG. 1.

A pattern discriminating circuit 50 is connected to an output of the regular converting circuit 40 and divides the multinary signals converted according to the regular conversion into a plurality of blocks each comprising four digits and checks the algebraic sum of the codes in each block. FIG. 5 shows an embodiment of a pattern discriminating circuit 50. Each of M11, M21, M31, M41 . . . M14, M24, M34, M44 is added to a summing amplifier 52 through a weighting circuit 51. That is, M11, M21, M31, M41 are weighted by "+2," M12, M22, M32, M42 are weighted by "+1," M13, M23, M33, M43 are weighted by 0 and M14, M24, M34, M44 are weighted by −1.

The output of the summing amplifier 52 is supplied to a comparator 53 and is compared with the comparison level 0. When the output of the summing amplifier 52 is smaller than the comparison level 0, the ouptut signal is provided at an output terminal J.

Figure 6:
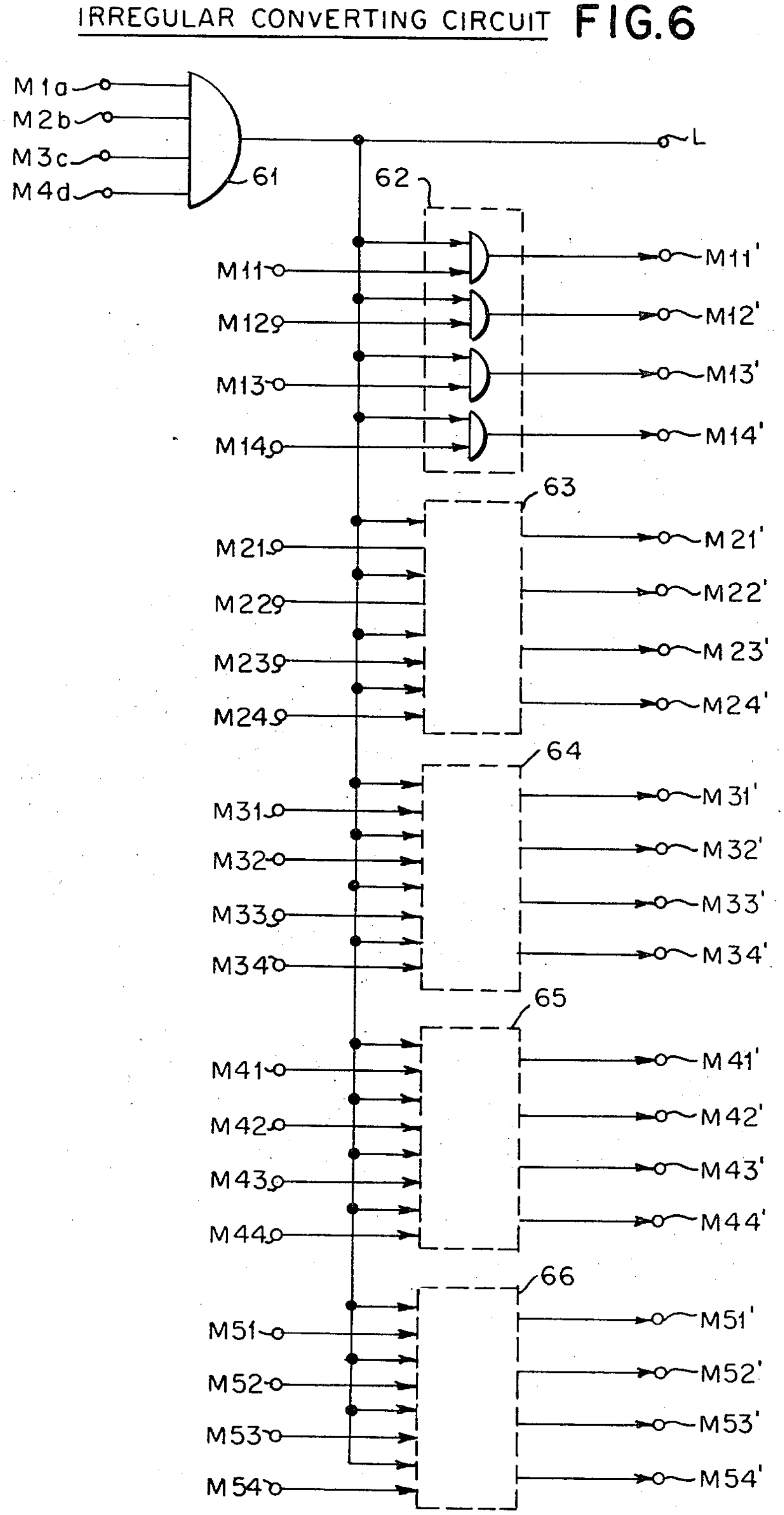
FIG. 6 is a block diagram of the irregular converting circuit of FIG. 1.

An irregular converting circut 60, as shown in FIGS. 1 and 6, is connected to an output of the regular converting circuit 40. The following conversion is performed in the irregular converting circuit 60. There are 35 blocks where the algebraic sum of every 4 bits of the multinary codes from the regular converting circuit 40 are negative, that is, patterns generating the output signal from the pattern discriminating circuit 50, for example, (2, −1 −1 −1), (1 0 −1 −1), (0 −1 1 −1) etc. Each of these blocks is converted into one of 35 classes such as (2 1 1 −2) (2 1 0 −2), (2 1 −1 −2), (2 0 0 −2), and so on. Each class includes +2 and −2, but the +2 and −2 are not continued one after the other.

Accordingly, the number of irregular converting circuits shown in FIG. 6 to be provided are 35. However, since an irregular pattern comprises 4 bits, only 4 terminals of the terminals M11′ to M14′, M21′ to M24′, M31′ to M34′ and M51′ to M54′ are necessary. Furthermore, only four AND gate circuits corresponding thereto are necessary, the other unnecessary AND gate circuits and corresponding input and output terminals may be omitted in the actual embodiment.

The circuit of FIG. 6 operates as hereinafter explained. If, for example, an AND gate circuit 61 detects the pattern of (1 0 −1 −1), the output M12 of the regular converting circuit 40 of FIG. 4 is connected to an input M1a and the output M23 is connected to an input M2*b* and the outputs M43 and M44 are connected to inputs M3*c* and M4*d*. Then, AND gate groups 62, 63, 64, 65 and 66 are weighted by +2, +1, 0, −1 and −2, respectively.

In an output MA*a*′ (A : 1~4, *a*′ : 1~4), *a*′ indicates the order of the binary system of the series input. Accordingly, if it is supposed that the pattern (1 0 −1 −1) is detected by an AND gate 61 and the corresponding irregular pattern is (2 1 0 −2), 1 is supplied as an input to M11, M22, M33 and M44. The pattern discriminating circuit 50 detects whether the pattern is continued or not. When the identical pattern codes are continued, the output signal is generated at the terminal K.

Each of the AND gates of the AND gate group 54 of FIG. 5 is connected to the output terminals M11 to M44 of the regular converting circuit so that the signal via a one bit delay circuit of the group 55 of delay lines and the direct signal are supplied as input. Furthermore, the output of AND gate group 54 is supplied to a common AND gate 56. Accordingly, when an output is provided by the AND gate 56, it is indicated that the codes of two blocks are the same patterns and the signal appears in the output terminal J through the output terminal K and an OR gate 57.

Figure 7:
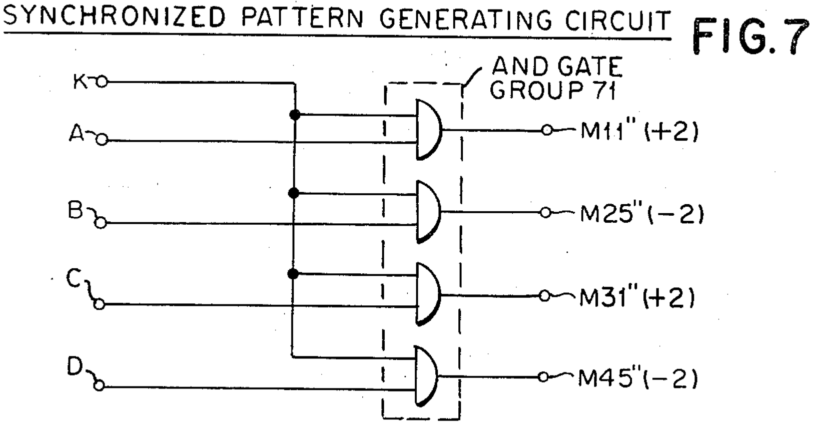
FIG. 7 is a block diagram of the synchronized pattern generating circuit of FIG. 1.

FIG. 7 illustrates a synchronized pattern generating circuit 70 connected to an output of the pattern discriminating circuit 50 of FIG. 1. The synchronized pattern generating circuit 70 comprises an AND gate group 71 and the signal for detecting whether the codes of the same pattern appear continuously at the terminal K of FIG. 5 is supplied to an input terminal K of the AND gate group 71. The signal 1, supposed to be weightened respectively by 2, −2, 2, −2, is supplied to the other input terminals A, B, C AND D. The signal 1 appears respectively at outputs M1A'', M2B'', M3C'' and M4D'' of the AND gate group 71.

A synchronized pattern in the aforedescribed case is accordingly 2, −1, 2, −1, and these four bits are synchronized block codes as hereinafter described. The output M*a*, M*b* is then of the regular converting circuit 40, the output J is of the pattern discriminating circuit 50, the output MAB' is of the irregular converting circuit 60 and each output M*a*B'' is of the pattern generating circuit 70.

FIG. 7 shows an embodiment of the synchronized pattern generating circuit 70 of FIG. 1, which comprises a group 71 of AND gates. A continuous detection singal having the same sign pattern which appears at the signal K of FIG. 5 is supplied to an input terminal of the group 71 of AND gates. The signals 1, assumed to be weighted at 2, −2, 2, −2, are supplied to the other input terminals A, B, C and D, respectively, and 1 is provided at the outputs M1A'', M2B'', M3C'' and M4D'' of the group 71 of AND gates.

A synchronous pattern of 2, −1, 2, −1 is provided. The four bits are the synchronous blocking signals hereinafter mentioned. The output M*a*, M*b* of the regular converting circuit 40, the output J of the pattern discriminating circuit 50, the output MAB' of the irregular converting circuit 60 and each output M*a*B'' of the pattern generating circuit 70 are all supplied to a parallel to series converting circuit 80 and a 4 bit signal per block is converted into a series signal. In these outputs, *a*, *b* and B' are one of 1, 2, 3 and 4, A is one of 1, 2, 3, 4 and 5, and B'' is one of 1, 2, 3, 4 and 5.

Figure 8:
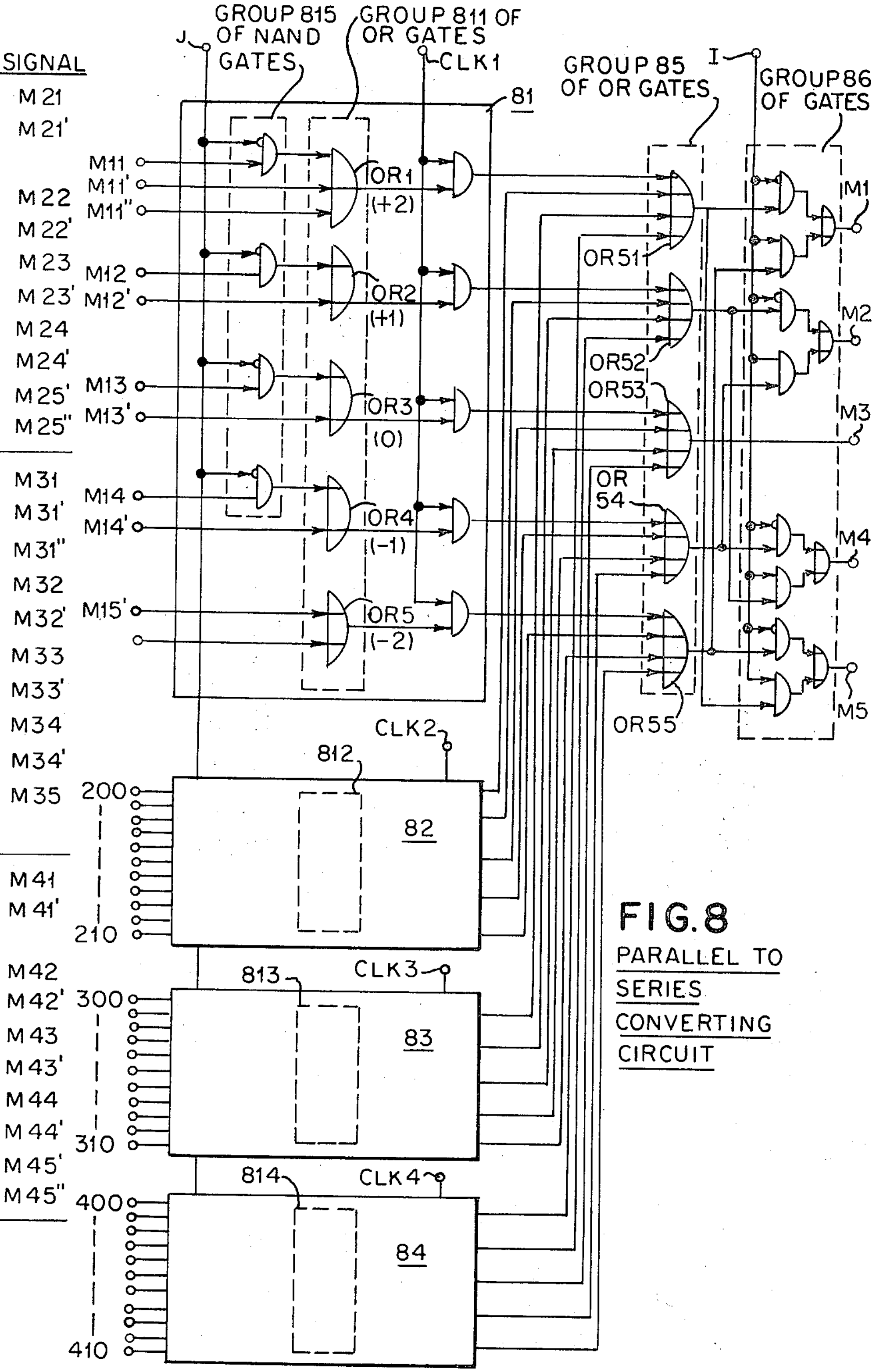
FIG. 8 is a block diagram of the parallel to series converting circuit of FIG. 1.

FIG. 8 is an embodiment of the parallel to series converting circuit connected to an output of each of the regular converting circuit 40, the pattern discriminating circuit 40, the irregular converting circuit 60 and the pattern generating circuit 70. In FIG. 8, each of the circuits 81 to 84 is the same. The circuit 81 comprises a group of OR gates 811. The circuits 82, 83 and 84 comprise groups of OR gates 812, 813 and 814, respectively. The outputs of the regular converting circuit 40, the irregular converting circuit 60 and the synchronized pattern generating circuit 70 are supplied to the OR gates corresponding to the assumed weights. In other words, the weight is assumed to be +2 for an OR gate OR1, +1 for an OR gate OR2, 0 for an OR gate OR3, −1 for an OR gate OR4 and −2 for an OR gate OR5.

A group of NAND gates 815 switch the outputs of the regular converting circuit 40 and the irregular converting circuit 60 or the synchronized pattern generating circuit 70. The output signal obtained at the output terminal J is supplied to one input terminal of the group of NAND gates 815 via the pattern discriminating circuit 50 or the sum of the multivalue code blocks is negative.

The group of NAND gates 815 is closed or switched to their non-conductive condition when a signal appears at the terminal J and the synchronous pattern is inserted instead of the output of the irregular converting circuit 60 when the same code pattern is continuous. Thus, an output signal is provided at the terminal K of FIG. 5, and the irregularly converted code pattern is supplied when the sum of the multivalue code blocks is negative.

Figure 9:
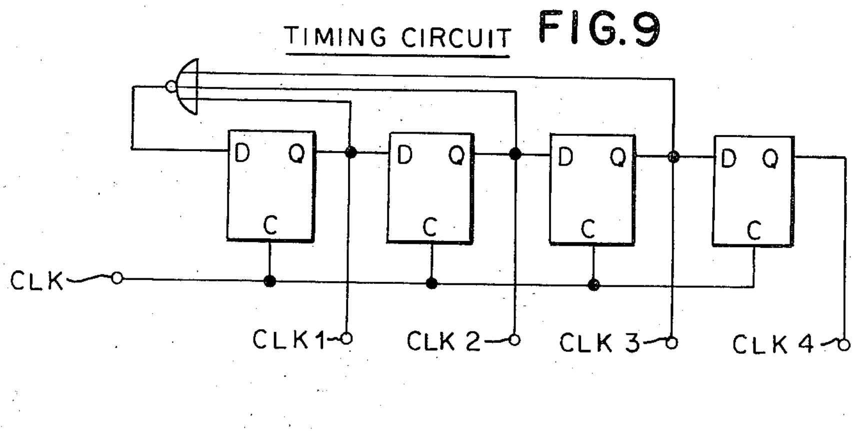
FIG. 9 is a block diagram of the timing circuit of FIG. 1.
Figure 10:
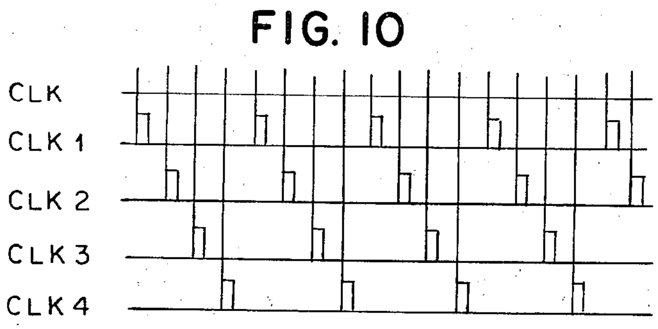
FIG. 10 is a time chart of the clock signals of FIG. 9.

Clock signals CLK1 to CLK4 are then applied successively to the circuits 81 to 84 and are converted into series signals. The clock signal is generated by a timing circuit 90 connected to the series to parallel converting circuit 30 and to the parallel to series converting circuit 80 of FIG. 1. The timing circuit 90 comprises shift registers as shown in FIG. 9 and its time chart is shown in FIG. 10. CLK corresponds to the transmission speed. The series to parallel converting of the multivalue code block is performed from CLK1 to CLK4. The outputs 81 to 84 of FIG. 8 are then provided via a group of OR gates 85. Furthermore, outputs M1, M2, M3, M4 and M5 are provided through a group of gates 86. The groups of gates 86 converts, by means of the signal I, the output of an OR gate OR51 to M5, the output of an OR gate OR52 to M4, the output of an OR gate OR54 to M2, and the output of an OR gate OR55 to M1.

Figure 11:
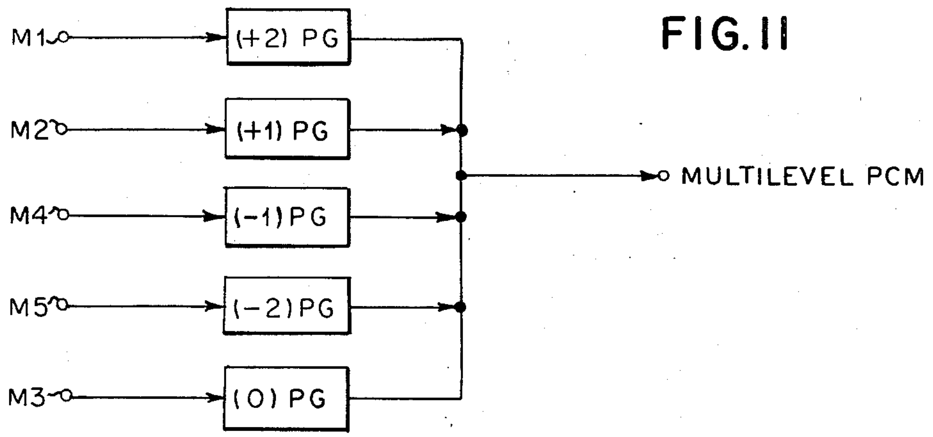
FIG. 11 is a block diagram of the multinary pulse generating circuit of FIG. 1.

Since it is assumed that each of M1 to M5 is weighted with +2, +1, 0, −1 and −2, they are supplied to a multivalue pulse generating circuit 100 connected to the output of the parallel to series converting circuit 80 and shown in FIG. 11. M1 to M5 are converted to the level corresponding to each. The multivalue pulse generating circuit 100 may be the same as the weighting circuit of FIG. 5, and it is easily attainable by obtaining the converted outputs of the switching transistors connected to the power supply corresponding to the levels +2, +1, 0, −1 and −2, respectively, by supplying the outputs of M1, M2, M3, M4 and M5 to the base electrodes of said transistors.

The output of the multivalue pulse generating circuit 100 is then integrated by an integrator 110, connected between the output of said multivalue pulse generating circuit and an input of the parallel to series converting circuit 80, as shown in FIG. 1. The output signal I is generated when the aforementioned integrated output becomes positive. The output signal I is supplied to the gate circuit 86 of the parallel to series converting circuit 80 and is transmitted via a transmission line TL, as described in Table 2, after converting M1, M2 and M4, M5 with M3 as the center.

TABLE 2

| | Integrated value positive | Integrated value negative |
|---|---|---|
| Algebraic sum positive: | (2,1,0,−1) | (−2,−0,1) |
| Algebraic sum zero: | (1,0,−1,0) | (1,0,−1,0) |

The multivalue code constituted as hereinbefore described is received by a receiver shown in FIG. 2, and is converted into a binary two system signal.

The synchronous block pattern is discussed prior to the operation of the receiver. It will be evident that the synchronized pattern is +2, −2, +2, −2 with reference to the synchronized pattern generating circuit 70. It is also feasible to make the synchronized pattern −2, +2, −2, +2. An object of the present invention is to provide synchronization by promptly determining the synchronous location by detecting a pattern of +2, −2; −2, +2, since the pattern +2, −2; −2, +2 is not used as the block signal.

Figure 12:
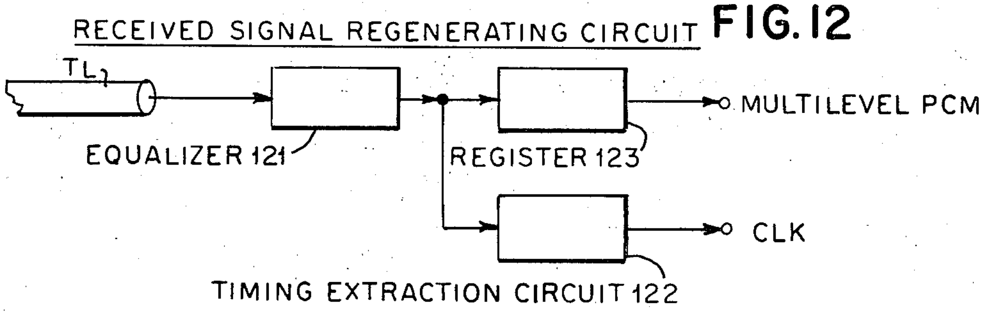
FIG. 12 is a block diagram of the received signal regenerating circuit of FIG. 2.

The receiver, including the synchronous system, is hereinafter described. The multivalue signal transmitted through the transmission line TL is supplied to a received signal regenerating circuit 120, shown in FIG. 12. The received signal regenerating circuit 120 includes an equalizer 121 which compensates the transmitting distortion of the pulse signal transmitted. The multivalue signal is supplied from the output of the equalizer 121 to a series to parallel converting circuit 130 through a register 123 simultaneously with extracting the timing clock CLK from a timing extraction circuit 122.

Figure 13:
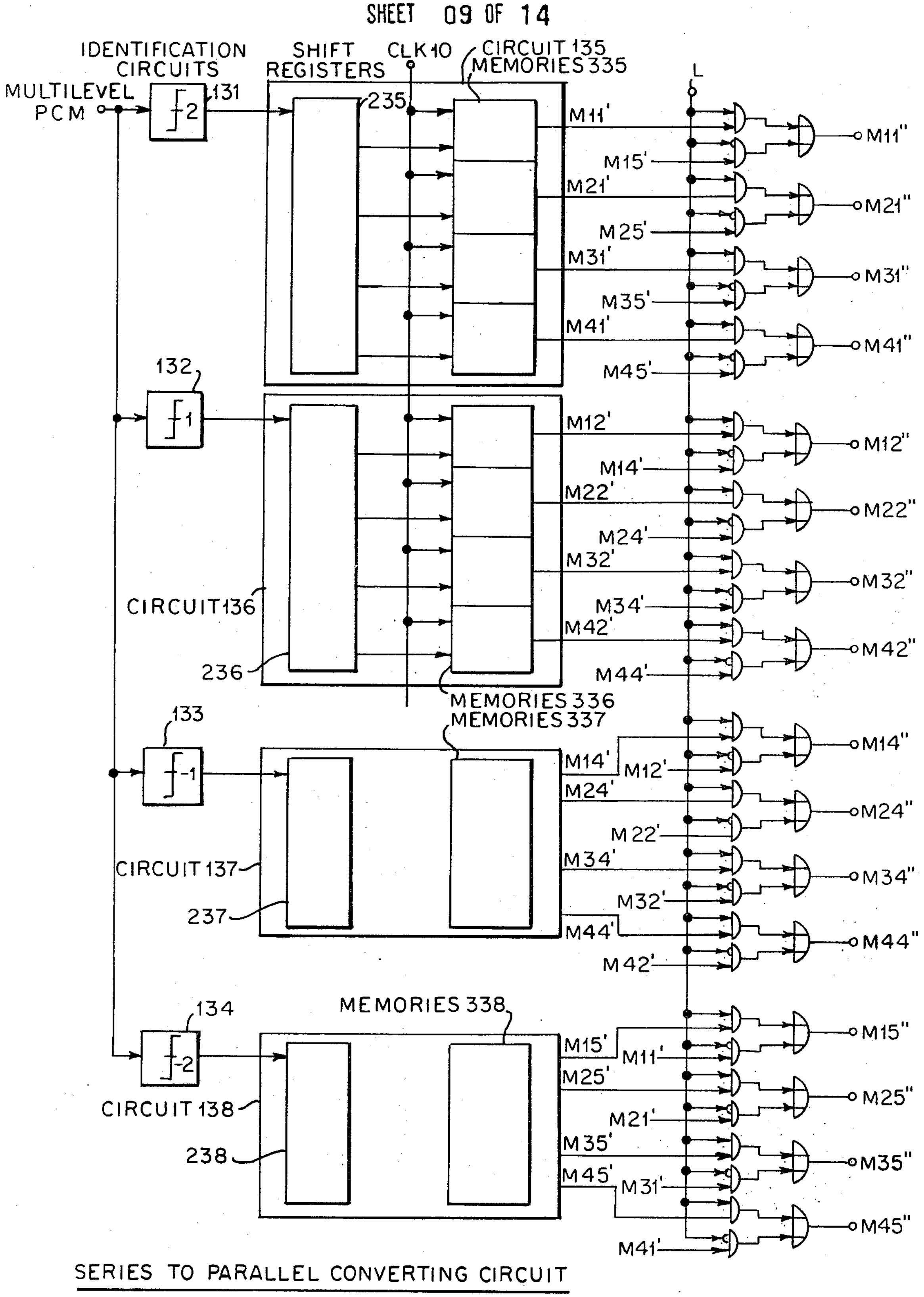
FIG. 13 is a block diagram of the series to parallel converting circuit of FIG. 2.

The series to parallel converting circuit of FIG. 13 is connected to an output of the received signal regenerating circuit 120 of FIG. 2. The series to parallel converting circuit 130 includes identification circuits 131, 132, 133 and 134 which detect the level of multivalue codes, each comprising the detection level of +2, +1, −1 or −2. The series to parallel converting circuit 130 distributes the input multivalue signals on each level. Every detected signal is supplied to shift registers 235 to 238. Circuits 135 to 138 are similar to the series to parallel converting circuit 30. 4 bits, which constitute one block of the multivalue code, correspond to a level of one of +2, +1, 0, −1 and −2, and those which correspond to +2, +1, −1 and −2 are stored in any one of the shift registers 235 to 238. The bit which corresponds to 0 is not stored.

Figure 14:
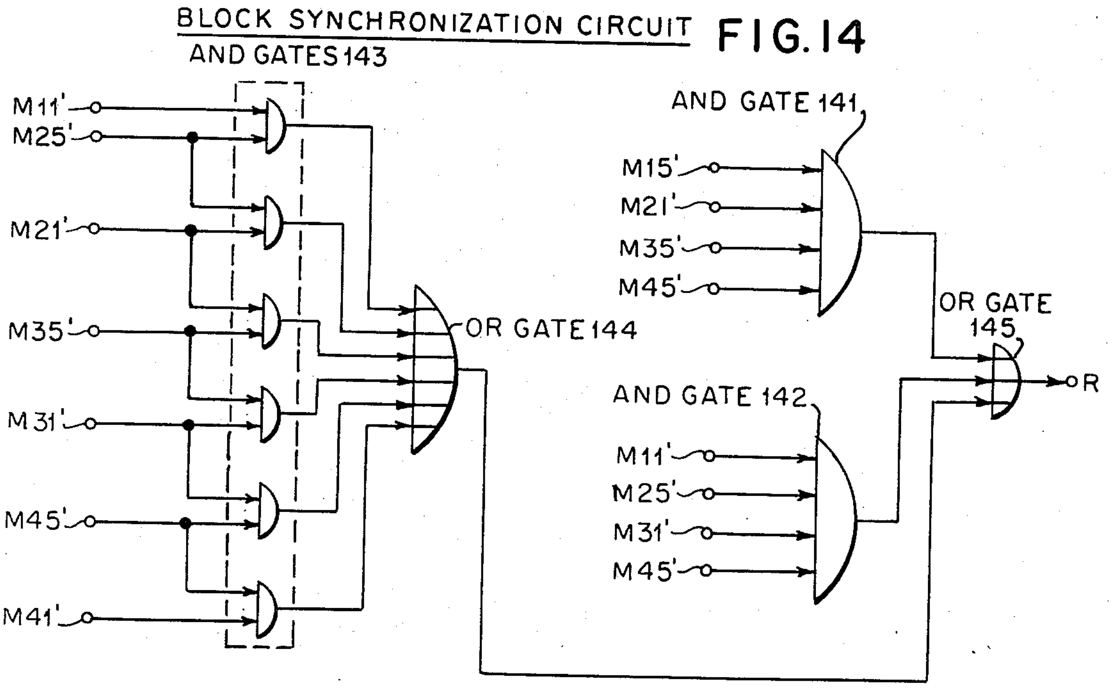
FIG. 14 is a block diagram of the block synchronization circuit of FIG. 2.

The contents of the shift registers 235 to 238 are stored in memories 335 to 338 via the clock CLK10 created by a timing circuit 150 shown in FIG. 15. At the same time, 4 bits corresponding to the following block are level detected and stored in corresponding shift registers 235 to 238. The multivalue codes corresponding to the levels +2, +1, −1 and −2 are stored in the memories 335, 336, 337 and 338, respectively. The contents M*ab*′, wherein *a* is any of 1 to 4 and *b*′ is any of 1, 2, 4 and 5, stored in the memories 335 to 338 are then supplied to a block synchronization circuit 140. The timing circuit 150 is connected to an output of the received signal regenerating circuit 120 and an output of the block synchronization circuit 140, as shown in FIG. 1, The block synchronization circuit 140 is shown in FIG. 14.

The block synchronization circuit 140 comprises AND gates 141 and 142 which detect the synchronous pattern of the special patterns of −2, +2, −2, +2 and +2, −2, +2, −2. A group of AND gates 143 and an OR gate 144 detect a pattern in which +2 and −2 are continuous as +2, −2 or −2, +2. That is, due to the fact that the pattern in whch +2 and −2 are continuous does not exist in the block code as previously described, but is generated only at the boundary of the block, the location when an output is obtained at the OR gate 144, that is, an output is obtained at an output terminal R of an OR gate 145, is determined as the synchronous location.

On the other hand, the timing circuit 150 of FIG. 15 produces clock signals CLK11, CLK12, CLK13 and CLK14 based on the clock signal CLK from the receiver regenerating circuit 120. The relation between these signals is shown in FIGS. **16*a* and 16*b*. Usually, the shift register is shifted by a clock signal through an AND gate 151, and clock signals CLK11, CLK12, CLK13 and CLK14 are produced, as shown in FIG. 16*a*. As is evident from FIGS. 13 and 14, the synchronous location of the block is detected in synchronism with the clock CLK10, and its detection signal R is produced. In this case, the AND gate 151 is closed, as shown in FIG. 15. Accordingly, the shift from CLK11 to CLK14 is stopped and no output is provided from CLK11 to CLK14 until the next block signal CLK10** appears.

On the other hand, a mode identification circuit 170, shown in FIG. 17, is connected to an output and an input of the series to parallel converting circuit 130 and the signal M*ab*′ from said series to parallel converting circuit is supplied to said mode identification circuit. The mode identification circuit 170 is shown in FIGS. 2 and 17. In FIG. 17, a weighting circuit 171 weights +2 for M11′, M21′, M31′ and M41′, +1 for M12′, M22′, M32′ and M42′, −1 for M14′, M24′, M34′ and M44′, and −2 for M15′, M25′, M35′ and M45′. The weighted signal is supplied to an addition amplifier 172, and the output of said amplifier is compared with the 0 level by a comparator 173.

If the comparator input is greater than the 0 level, a comparison signal L is produced, which is supplied to the series to parallel converting circuit 130 in FIG. 2. The signal L changes over M11′ to M41′, to M15′ to M45′, changes over M12′ to M42′, to M14′ to M44′, thus producing an output M*ab*″, wherein *a* is 1 to 4 and *b*″ is 1, 2, 4 or 5. The output of the series to parallel converting circuit 130 is supplied to a regular reverse converting circuit 190 and to an irregular reverse converting circuit 180, and an operation which is the reverse of that at the transmitter, as shown in FIGS. 4 and 6, is performed. At the same time, the aforedescribed output is supplied to a pattern discriminating circuit 200, detecting the synchronized pattern.

The irregular reverse converting circuit 180 is shown in FIG. 18, and a reverse operation to the irregular reverse converting circuit at the transmitter, as shown in FIG. 6, is performed. In FIG. 18, a gate circuit 181 detects an irregular conversion pattern including 0, such as "210-2," "120-2" and "−201-2," In a gate 281, Mal″ is connected to M21″ in case "201-2" is detected.

At the same time, in an AND gate 381, M*b*A″, M*c*B″ and M*d*D″ are connected to M41″, M32″ and M15″, respectively. This means that "210-2" is detected when an output is provided at the AND gate 381. Accordingly, the gate circuits 181, and so on, are provided by the number of the irregular conversion pattern including 0; each being connected to the corresponding output of the series to parallel converting circuit 130.

On the other hand, an AND gate 182 detects an irregular conversion pattern which includes 0. Thus, for example, M*a*′1″, M*b*′2″, M*c*′4″ and M*d*5″ are connected to M41″, M32″, M24″ and M15″, respectively, in order to detect 21-1-2 and the gate circuits are provided by the number of irregular conversion patterns including 0, each being connected to the output of the corresponding series to parallel converting circuit 130. Then, each of groups 183 to 185 of AND gates are provided at each detection gate 181, 182 . . . , and signals corresponding to the irregular conversion at the transmitter are supplied to input terminals A, B, C and D of the aforesaid groups of AND gates.

When the regular conversion pattern which makes the algebraic sum converted to 2 1 0 −2 negative is "1 −1 −1 0,"1 is put into 2A, 3B and 3C, and when the regular pattern is converted to 2 1 −1 −2 is "2 −1 −1 −1" 1 is supplied at 1A, 3B, 3C and 3D. It is assumed that the output of the group of AND gates 183 is weighted at +2, the output of the group of AND gates 184 is weighted at +1, and the output of the group of AND gates 185 is weighted at −1. A weighting circuit corresponding to 0 is omitted, because it is not required for the regular reverse converting circuit 190, hereinafter described.

Only three terminals are required among the outputs of the groups of AND gates 183 to 185 for the respective irregular pattern, and only three AND gate circuits corresponding to the foregoing groups are required. However, unnecessary AND gate circuits are omitted in practice, similarly to the irregular converting circuit 60 of FIG. 6.

The regular reverse converting circuit 190, shown in FIG. 19, is hereinafter described. The circuit of FIG. 19 corresponds to the converting circuit at the ath bit of binary systems. Accordingly, another three circuits similar to the circuit of FIG. 19 are provided. However, the input signals supplied to each input terminal are different from each other.

The converting circuit at the ath bit of FIG. 19 is hereinafter described. Special consideration is made in the case of $a$=1. Among the signals from the series to parallel converting circuit 130, M11, M12 and M14, and M21, M22 and M$a$4, respectively, are supplied to the input terminals. The signal from the series to parallel converting circuit 130 is controlled by the detection signal L of an irregular pattern, as shown in FIG. 18, and is switched to the irregular pattern signal. Signlas M$a$1, M$a$2 and M$a$4 are effective, and of these, M$a$1, M$a$2 and M$a$4 will never exist at the same time.

The multivalue level of +2 is therefore assumed and 1 is supplied to PCM1A and 0 to PCM2A, in case of M$a$2'' and a multivalue level of −1 is assumed and 0 is supplied to PCM1A and 1 to PCM2A. It shows that the reverse conversion from binary to quadruple code is executed, as shown in FIG. 4. When M$a$1'', M$a$2'' and M$a$3'' become effective, the reverse conversion of binary to quadruple code, that is, quadruple to binary conversion, is executed. A signal K is supplied to a group 192 of gates in FIG. 19, but this is a detection signal of the synchronous pattern discriminating circuit 200 shown in FIGS. 2 and 20.

The pattern discriminating circuit 200 detects a special pattern "+2, −2, +2, −2" or "−2, +2, −2, +2" inserted when there is a synchronous pattern, that is, when two clocks are of the same code. In this case, the group 192 of gates is closed and a binary sign one bit ahead is tranferred through one bit delay lines or circuits 193 in FIG. 19. On the other hand, if there is an irregular pattern signal, M$a$1'', M$a$2'' and M$a$3'' are made effective by the signal L. M$a$1'' is then supplied as an input with a signal from the group 183 of AND gates in FIG. 18, M$a$2'' is supplied as an input with a signal from the group 184 of AND gates, and M$a$3'' is supplied as an input with a signal from the group 185 of AND gates, and quadruple to binary conversion is provided in a similar manner as the signal from the series to parallel converting circuit 130.

The 4 parallel bit binary signal thus obtained is supplied to a parallel to series converting circuit 210, shown in FIGS. 2 and 21, and connected to the output of the regular reverse converting circuit 190 and to the output of the timing circuit 150. The parallel to series converting circuit 210 converts the 4 parallel bit binary signal, as shown in FIG. 21, by clocks CLK11, CLK12, CLK13 and CLK14, from parallel to series. The clocks CLK11, CLK12, CLK13 and CLK14 are shown in FIG. 16b. The clocks CLK11 to CLK14 are supplied to AND gates 211, 212, 213, 214, 215, 216, 217 and 218, thereby providing binary two-system PCM signals.

As hereinbefore described, one of the features of the present invention is the provision of block synchronization by detecting at the receiver special patterns such as +2 −2, +2 −2 and −2 +2, −2 +2, inserted at the transmitter. The probability of insertion of these special patterns may be expressed as follows:

$$Pb = \{ m^2 + (1-m)^2 \}^2 \qquad (1)$$

The probability of generation of the special patterns is as shown by a curve Pb of FIG. 22. In FIG. 22, the abscissa represents the mark rate and the ordinate represents the probability. After block synchronization has been provided by the regeneration signals, the signals are converted into parallel codes by the series to parallel converting circuit 130 (FIG. 2). Then, codes in a block, the algebraic sum of which is negative, are converted into codes the algebraic sum of which is positive or zero, by an operation reverse to the operation of Table 2 by the use of the mode identification circuit 170 (FIG. 2).

The multinary codes are then converted back into the original binary codes by a conversion reverse to the conversion of Table 1 by the use of the irregular reverse converting circuit 180, the pattern discriminating circuit 200 and the regular reverse converting circuit 190 (FIG. 2). The binary codes are converted into series signals by the parallel to series converting circuit 210 (FIG. 2) and the series signals are supplied to a binary PCM processing circuit.

On the other hand, another feature of the invention is the provision of block synchronization by detecting the synchronized position by detecting patterns of ±2, ∓2, because patterns of ±2, ∓2 are not used as block codes and these patterns are generated only in the boundary between blocks. The probability of generation of these patterns is varied by the mark rate of the input signals and may be expressed as follows:

$$Pa = \{ m^2 + (1-m)^2 \, \alpha m \}^2 \qquad (2)$$

wherein $m$ is the mark rate of the input signals and $\alpha m$ is the rate of increase due to irregular conversion. The probability $Pa$ of generation is shown by a curve $Pa$ of FIG. 22.

In the aforedescribed embodiment, series to parallel conversion and parallel to series conversion are provided because it simplifies the processing. However, these conversions are not absolutely necessary in the present invention. Furthermore, it is clear that a greater effect may be provided by combining the first block synchronization system of the invention with the second block synchronization system.

As shown in FIG. 22, the probabilities $Pa$ and $Pb$ depend on the mark rate, but by a combination of the two methods it is possible to realize a stabilized synchronization detecting probability which does not depend on the mark rate.

Non-coincidence detecting probability available when the first and second methods are used in accordance with the invention is compared with the probability in another system in FIG. 23. In FIG. 23, the abscissa represents the mark rate and the ordinate represents the probability. In FIG. 23, curves 1 and 3 illustrate a conventional block synchronization system utilizing a 5 digit system and a 3 digit system, respectively. A curve 2 in FIG. 3 illustrates a block synchronization system utilizing the 4 digit system of the present invention.

Next, the merits of the method of the invention are as follows:

1. Since the pattern is not included in the signals is used as the synchronization detecting pattern, the reset system may be utilized. Immediately after the detection of synchronization, synchronization may be provided if there is one bit. The conventional systems require more time than the system of the invention between the detection of non-incidence and synchronized reset. The 3 digit system requires a time of about 90 digits and the 5 digit system requires a time of about 70 digits.

2. In the system of the invention, only a period of time equal to a multiple of the non-coincidence detecting time is required for synchronization protection, due to the use of the special pattern, whereas in the conventional system, a period of time equal to a square of the non-coincidence detecting time is required. This is due to the peculiarity of the synchronized pattern.

3. Furthermore, in the second method only, patterns of $\pm 2$, $\mp 2$ are only used as synchronization detecting patterns, so that patterns of $\pm 2$, $\mp 2$, $\pm 2$, $\mp 2$, may be considered to be equal to the other code patterns and the informatiom may be sent with these patterns.

4. The inserted pattern for synchronization has a code distance of 2 from the other signal patterns and therefore has less probability of code error.

5. Since in the invention, one block comprises four digits, the matching with the presently adopted PCM multiplexing system, such as PCM-8OOM, is excellent, and the size and constitution of the system including the multiple exchange system may be simplified.

As hereinbefore mentioned, by combining the first block synchronization system with the second block synchronization system, the synchronization detection may be provided without departing on the mark rate of the input signals.

While the invention has been described by means of specific examples and in a specific embodiment, it should not be limited thereto, for obvious modifications will occur to those skilled in the art without departing from the spirit and scope of the invention.

We claim:

1. A block synchronization system of multinary codes in a multinary transmission system which transmits multinary code blocks converted in a block unit from binary PCM signals, said block synchronization system comprising transmitting means having input means supplying binary PCM signals, regular converting circuit means having an input connected to the input means for converting the binary PCM signals into code blocks each having four multinary code digits and having output means, pattern discriminating circuit means having an input connected to the output means of the regular converting circuit means for checking checking algebraic sum of the four multinary code digits in each code block and providing an output signal when the albebraic sum is negative and having an output, and having means for comparing successive patterns of the code blocks irregular converting circuit means having an input connected to the output means of the regular converting circuit means for converting the code block of the regular converting circuit means into a code block having no two specific codes continuously one after the other when the sum of the four multinary code digits in the code block of the regular converting circuit means is negative and having an output, synchronized pattern generating circuit means having an input connected to the output of the pattern discriminating circuit means for generating a code block having a pattern different from the patterns of the code blocks of the regular converting circuit means and the irregular converting circuit means when the pattern discriminating circuit means further detects the same patterns of the code blocks of the regular converting circuit means continuously and having an output, and transmitter output means connected to the output means of the regular converting circuit means and connected to the outputs of the pattern discriminating circuit means, the irregular converting circuit means and the synchronized pattern generating circuit means for transmitting the code block of the irregular converting circuit means when the pattern discriminating circuit means provides the output signal and the code block of the synchronized pattern generating circuit means when the pattern discriminating circuit means further detects the same patterns of the code blocks of the regular converting circuit means continuously; and receiving means for receiving the transmitted code blocks having detecting means for detecting two specific codes continuously and providing block synchronization.

2. A block synchronization system as claimed in claim 1, wherein the multinary code is a quaternary code.

* * * * *